US011666076B2

(12) United States Patent
Nicole et al.

(10) Patent No.: US 11,666,076 B2
(45) Date of Patent: Jun. 6, 2023

(54) METHOD TO NATURALLY BRAND A LETTUCE

(71) Applicant: SIGNIFY HOLDING B.V., Eindhoven (NL)

(72) Inventors: Céline Catherine Sarah Nicole, Eindhoven (NL); Marcellinus Petrus Carolus Michael Krijn, Eindhoven (NL); Gus Van Der Feltz, Den Bosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 460 days.

(21) Appl. No.: 16/300,100

(22) PCT Filed: May 9, 2017

(86) PCT No.: PCT/EP2017/060994
§ 371 (c)(1),
(2) Date: Nov. 9, 2018

(87) PCT Pub. No.: WO2017/194502
PCT Pub. Date: Nov. 16, 2017

(65) Prior Publication Data
US 2019/0142038 A1  May 16, 2019

(30) Foreign Application Priority Data
May 9, 2016 (EP) .................................... 16168743

(51) Int. Cl.
*A23L 5/40* (2016.01)
*A23N 15/06* (2006.01)
(Continued)

(52) U.S. Cl.
CPC ............... *A23L 5/40* (2016.08); *A01G 7/00* (2013.01); *A01G 7/045* (2013.01); *A23N 15/06* (2013.01)

(58) Field of Classification Search
CPC ............ A23N 15/06; A23L 5/40; A01G 7/045
See application file for complete search history.

(56) References Cited

U.S. PATENT DOCUMENTS

| 5,660,747 A | 8/1997 | Drouillard et al. |
| 2013/0224352 A1 | 8/2013 | Ibanez Puchades et al. |
| 2014/0105958 A1* | 4/2014 | Ntoya ............... A23L 33/15 |
| | | 424/439 |

FOREIGN PATENT DOCUMENTS

| CN | 1041869 A | 5/1990 |
| CN | 103574348 A | 2/2014 |

(Continued)

OTHER PUBLICATIONS

Martin Professional: "MAC Quantum Profile," Nov. 2014, Retrieved From Internet: URL: https://www.youtube.com/watch?v=nre7_lrcwzg, (2 Pages).

(Continued)

*Primary Examiner* — Katherine D LeBlanc

(57) ABSTRACT

The invention provides a method for providing a non-uniform pigment distribution in a first plant part (110) of a pigment generating plant (100), which accumulates pigment upon exposure by light, during indoor cultivation of said plant (100), wherein the first plant part (110) comprises a second plant part (120) and a third plant part (130), the method comprising subjecting in a first lighting stage at least the first plant part (110) to first light conditions that inhibit or prevent pigment accumulation in said first plant part (110), and subsequently subjecting in a second lighting stage the second plant part (120) of said first plant part (110) to second light conditions that promote pigment accumulation (Continued)

in said second plant part (120) while subjecting the third plant part (130) of said first plant part (110) to third light conditions that inhibit or prevent pigment accumulation in said third plant part (130).

16 Claims, 3 Drawing Sheets

(51) Int. Cl.
    *A01G 7/00*    (2006.01)
    *A01G 7/04*    (2006.01)

(56) References Cited

FOREIGN PATENT DOCUMENTS

| | | |
|---|---|---|
| EP | 1763991 A1 | 3/2007 |
| FR | 2815816 A1 | 5/2002 |
| GN | 1930945 A | 3/2007 |
| JP | S4918618 A | 2/1974 |
| JP | H01137925 A | 5/1989 |
| JP | H04370041 A | 12/1992 |
| KR | 20000051124 A | 8/2000 |
| WO | 2012090897 A1 | 7/2012 |

OTHER PUBLICATIONS

Yu Wang, et al., UV-A Light Induces Anthocyanin Biosynthesis in a Manner Distinct From Synergistic Blue + UV-B Light and UVA-A/Blue Light Responses in Different Parts of the Hypocotyls in Turnip Seedlings, Plant and Cell Physiology, 2012 (11 Pages).

W. Garrett Owen, et al., End-of-Production Supplemental Lighting With Red and Blue Light-Emitting Diodes (LED's) Influences Red Pigmentation of Four Lettuce Varieties, dept. of Horticulture and Landscape Architecture, 2015 (9 Pages).

\* cited by examiner

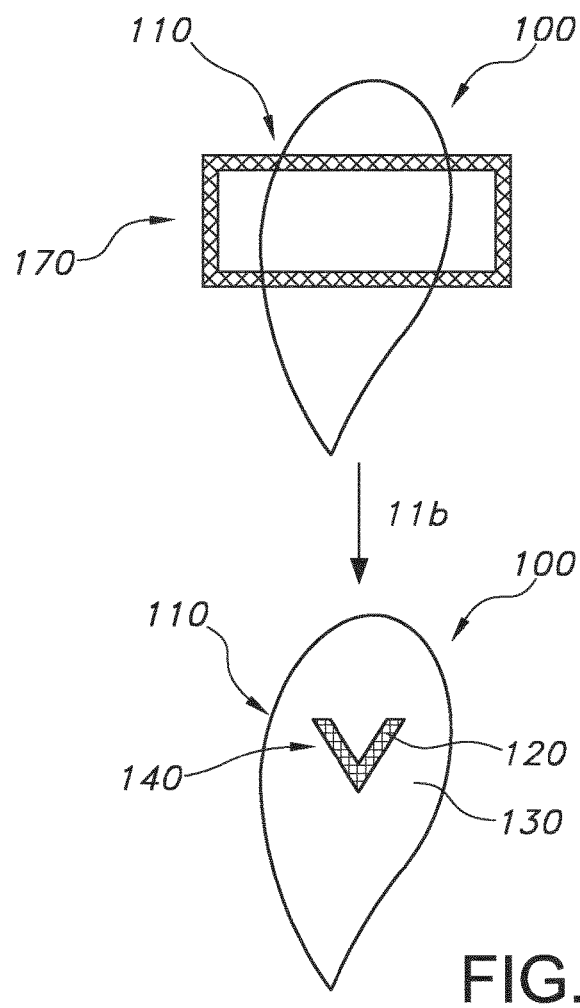
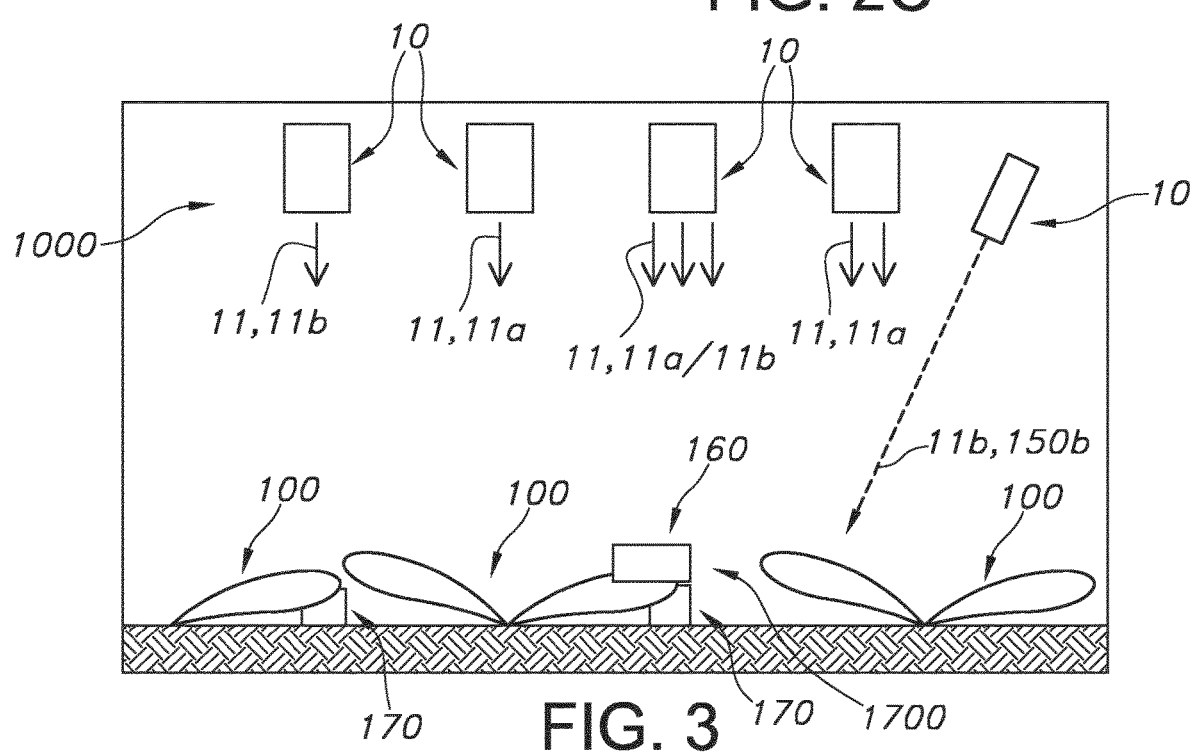

METHOD TO NATURALLY BRAND A LETTUCE

CROSS-REFERENCE TO PRIOR APPLICATIONS

This application is the U.S. National Phase application under 35 U.S.C. § 371 of International Application No. PCT/EP2017/060994, filed on May 9, 2017, which claims the benefit of European Patent Application No. 16168743.9, filed on May 9, 2016. These applications are hereby incorporated by reference herein.

FIELD OF THE INVENTION

The invention relates to a method for lighting a plant. The invention also relates to a method of cultivating a plant. Yet, the invention also relates to a computer program product for executing the method for lighting a plant. Further, the invention relates to a lighting system.

BACKGROUND OF THE INVENTION

Providing a sign on fruit is known in the art. FR2815816, for instance, describes a mask which is part transparent, on which is deposited, by laser or ink jet printing, opaque pigments so as to form clear and dark parts. The mask is chosen from amongst, color or black and white negative film, a color or black and white slide film. The clear and dark parts of the mask form a group of recognizable distinctive signs, such as letter characters. FR2815816 further describes a method of selectively coloring the skin of a fruit which naturally changes color when exposed to light, which includes: (a) choosing a zone on the skin of the fruit which will change its color under the action of natural or artificial light; apply to the chosen fruit zone a mask having one or more transparent (clear) zones sensitive to natural or artificial light, as well as one or more or weak (dark) light transmitting zones; illuminate the mask on the fruit for a time sufficiently long so that the fruit zone under the mask naturally changes color, in correspondence which the clear and dark parts of the mask.

WO 2012/090897 A1 discloses a plant cultivation system comprising an ion generating device which can generate positive ions and negative ions in a space in which a plant is to be cultivated. This system enables the enhancement of the accumulation of a pigment in the plant.

SUMMARY OF THE INVENTION

Plants use the process of photosynthesis to convert light, $CO_2$ and $H_2O$ into carbohydrates (sugars). These sugars are used to fuel metabolic processes. Sugars are also used for biomass formation. This biomass formation includes stem elongation, increase of leaf area, flowering, fruit formation, etc. The photoreceptor responsible for photosynthesis is chlorophyll. Apart from photosynthesis, also photoperiodism, phototropism and photomorphogenesis are representative processes related to interaction between radiation and plants:

photoperiodism refers to the ability that plants have to sense and measure the periodicity of radiation (e.g. to induce flowering),
  phototropism refers to the growth movement of the plant towards and away from the radiation, and
  photomorphogenesis refers to the change in form in response to the quality and quantity of radiation.

The use of a mask on e.g. apples to provide a sign by different pigment concentrations, as described above, may imply that the mask may only be provided when the apple is substantially fully grown but substantially before coloration starts. Hence, this implies a delicate timing with the risk of being too late and with the disadvantage of a rather short period to use the (human) resources to apply the masks to all apples. Further, such method may not be used for plants and fruits, etc., that already color during the growth stage upon exposure by light, and not only during a ripening stage (such as in the case of apples).

Hence, it is an aspect of the invention to provide a(n) (alternative) method for providing a pattern on a plant part, especially of a leafy vegetable (part), which preferably further at least partly obviates one or more of above-described drawbacks. It is also an aspect of the invention to provide an alternative method for growing a plant. Yet, it is also an aspect to provide an alternative computer program product which can execute the (alternative) method for providing a pattern on a plant part, which preferably further at least partly obviates one or more of above-described drawbacks. Further, it is yet an aspect to provide an alternative lighting system that can e.g. be used for executing the alternative method for providing a pattern on a plant part, which preferably further at least partly obviates one or more of above-described drawbacks.

Light quality and intensity increase and trigger the production of nutrient content in plants. Some of those nutrients are pigments which give the plant a photo-protective property or have a role in attracting pollinators (in flowers mainly). Anthocyanin is a pigment present in many crops, which role is to protect the plant upon too high radiation. This pigment is naturally produced by a plant when the plant encounters an abiotic stress. The pigment can have a red, purple or blue coloration depending on the pH in the plant.

Anthocyanin accumulation can be controlled and activated using light intensity. As a characteristic example, the shaded side of an anthocyanic apple is less red than the sunlit side of the apple, and the concentration of anthocyanin in the two sides is genotype dependent.

Besides light intensity, anthocyanin biosynthesis can be a light wavelength-dependent process. Specifically, ultraviolet (UV) light appears to be particularly effective in stimulating anthocyanin biosynthesis in several different plant species. Besides UV light, blue light also appears to have high capacity in coloring e.g. red type lettuce (anthocyanic coloration) and specifically a capacity which is (substantially) higher compared to that of red light. This effect appears to be independent of the developmental stage of a non-senescing leaf such that light-dependent stimulation of anthocyanin biosynthesis can be triggered at any moment in response to light.

Therefore, e.g. lettuce red coloration can be actively controlled by manipulating light properties either in early vegetative growth stages or a few days before harvest. Furthermore, the stimulation of the process is locally restricted within the boundaries of a cell such as light perception at cell level is required for the stimulation of anthocyanin biosynthesis (some other responses to light can be communicated between plant cells, tissues even organs). This means that leaves which are shaded will not color upon a unidirectional light illumination.

Hence, it is herein suggested to use a growth phase light recipe, to color e.g. red type lettuce crop, which is also working for most vegetables accumulating anthocyanin. The coloration of a vegetable during its growth with light can thereby be controlled well. It appears that anthocyanin accumulation can be well controlled in time and locally using lighting as an abiotic stress, especially as substantially sole abiotic stress. Using this property it is e.g. possible to imprint a logo or a brand or a colored pattern on a vegetable playing with the contrast of colored (red) or non-colored (green) that the vegetable produces naturally.

Hence, in a first aspect the invention provides a method for providing a non-uniform pigment distribution in a first plant part of a pigment generating plant, which (pigment generating plant) accumulates pigment upon exposure by light, during indoor cultivation of said plant, wherein the first plant part ("first part") comprises a second plant part ("second part") and a third plant part ("third part"), the method comprising subjecting in a first lighting stage at least the first plant part to first light conditions that inhibit or prevent pigment accumulation in said first plant part, and subsequently subjecting in a second lighting stage the second plant part of said first plant part to second light conditions that promote pigment accumulation in said second plant part while (still) subjecting the third plant part of said first plant part to third light conditions that inhibit or prevent pigment accumulation in said third plant part.

With such method, it is possible to grow plants and provide in a controlled way and in a natural way a pattern in a part of the plant. Timing (of application of the pattern) can be controlled much better and the number of types of plants that can be provided with a pattern with the present method is larger than with other methods. Further, it is now possible to provide a pattern also to those types of plants that already color during the growth phase, such as red type lettuce, etc.

The term "plant" especially refers to Plantae, even more especially to Embryophyta, such as angiosperms.

The term "first plant part" or more in general "plant part" may refer to a leaf, a flower leaf, a stem, a branch, and a fruit. The term "plant part" does not refer to parts of the plant that are in general below a solid or liquid surface, such as under the soil. In embodiments, the term "plant part" may refer to substantially the entire part of the plant above the soil, such as in the case of (red) lettuce. In yet other embodiments, it may refer to only part thereof, such as a single leaf. In further embodiments, the term "plant part" may refer to an entire fruit, such as an apple. In yet other embodiments, it may refer to only part thereof. The term "plant part" especially refers to those parts of plant wherein pigments may be generated, such as to the epidermis of (part of) the plant, or the pericarp of (part of) the plant, or the mesophyll containing part of (part of) the plant. The term "first plant part" especially refers to a part of the plant at least including part of the plant that may directly receive light. Hence, the first plant part may include at least a part of the outer layer of the plant.

The invention is especially related to horticulture applications, even more especially to horticulture applications wherein lighting can be controlled, such as in plant factories, in glass houses, or in other at least partly closed environments wherein lighting can be controlled. Yet even more especially, the invention relates to applications wherein plants are grown under substantially only artificial lighting conditions. Especially, the invention is related to indoor growth or indoor horticulture applications. Hence, the invention is mainly directed to indoor generation of fruits, vegetables, flowers, etc., though optionally the invention may also be directed to indoor generation of trees and other types of plants.

The plants that are suitable for application of the method are especially those plants that under normal outdoor conditions generate pigments in at least part of the plant when exposed to light. Plants generate under influence of light, especially an abundance of light, pigments, in leaves and/or fruits. Hence, abiotic stress (especially due to light) may induce pigment formation. The pigment generating plant is especially a plant that generates or accumulates pigments upon exposure by light, especially light comprising blue and/or UV components. Hence, the plants that can be used in the present invention are those plants of which at least part naturally changes color when exposed to light. In this invention, such plants are indicated as pigment generating plants.

The term "pigment accumulation" especially refers to the accumulation of a pigment in the plant (part). Pigment accumulation is a natural reaction of some plants upon abiotic stress, such as (a surplus of) solar (and/or artificial) light. Hence, the (lighting) conditions of the first stage may be chosen such that etiolated growth is prevented but also such that coloration is also substantially prevented. By routine experimentation, these conditions can be found by the person skilled in the art. Hence, especially the conditions, such as temperature, humidity, supply of water and supply of nutrients are substantially normal and within the acceptable range for the plant growth. Especially, the only abiotic stress that may be applied may be due to the lighting conditions. Under normal growth conditions, biomass production continues and growth is not impaired.

Hence, the invention especially provides a method for providing a non-uniform pigment distribution in a first plant part of a pigment generating plant during indoor cultivation of said plant, wherein the first plant part comprises a second plant part and a third plant part, the method comprising subjecting in a first stage at least the first plant part to abiotic non-stress conditions, and subsequently subjecting in a second stage the second plant part of said first plant part to abiotic stress conditions thereby promoting pigment accumulation in said second plant part while (still) subjecting the third plant part of said first plant part abiotic non-stress conditions that inhibit or prevent pigment accumulation in said third plant part. Therefore, in embodiments the method comprises indoor cultivation of said plant under abiotic non-stress conditions during the first stage. Hence, especially during the first stage the plant is subjected to conditions that do not generate abiotic stress, i.e. abiotic non-stress conditions. Whereas a biomass production continues, substantial pigment accumulation may in this way be prevented or inhibited.

The pigments that may be produced are especially anthocyanins and/or other flavonoids. Anthocyanins are naturally occurring pigments that may appear red, purple, or blue depending on the pH. Anthocyanins occur in tissues of higher plants, including leaves, stems, roots, flowers, and fruits.

In embodiments, the plant comprises an apple, or a pear, etc.

Especially, in embodiments the plant comprises a leafy vegetable. In yet further embodiments, the plant is selected from the group consisting of a red type lettuce, a red mustard, etc. Especially, the method is suitable for leafy vegetables. Hence, in embodiments the plant comprises a red type lettuce (*Lactuca sativa*) or a red leafy green (from the *Brassica* family), for example red mustard.

During the first lighting stage, light may be provided substantially only for creation of biomass and in the second stage, e.g. when there is enough biomass, the second plant part is subjected to abiotic stress, leading to pigment accumulation in that part.

As indicated above, the term "plant part" may refer to the entire (above-ground) part of a plant, but may also refer to only part thereof. When the plant part is only part of the plant, the remainder of the plant may be subjected to conditions that accumulate pigment. Especially however, in embodiments the first lighting stage is a stage wherein the entire plant is subjected to abiotic non-stress conditions. Abiotic stress conditions may in embodiments also include the supply of nutrients and the control of the temperature such that pigment accumulation is reduced or inhibited.

The term "first plant part" may refer to a plurality of first plant parts (comprised by the same plant). For instance, the different types of patterns may be provided to different parts of the plant. However, also the same or different patterns may be provided on different leaves of the plant. When assuming a fruit as plant part, a plurality of fruits of the same plant may be provided with a pattern according to the method of the invention.

The first plant part comprises a second plant part and a third plant part. Hence, there are at least two parts comprised by the first plant part. With these two parts, patterns may be created, e.g. with light letters amidst a pigment accumulated background, or especially vice versa, pigment accumulated letters amidst a lighter color or pale background. Note that such (pale) background may in embodiments be surrounded by parts of the plant that have accumulated pigment, e.g. due to the lighting in the second stage.

In embodiments, the method also comprises selecting the second plant part and the third plant part to form a pattern provided during the second lighting stage by pigment content differences, with the second plant part having a higher pigment accumulation than the third plant part. Hence, the second plant part and the third plant part may form a pattern due to the non-uniform man-controlled pigment accumulation. The pattern may in embodiments comprise one or more of a letter, a symbol, and a code. The pattern may in embodiments also comprise a favicon, etc. For instance, one or more words (such as "fresh") may be pigment printed in the first plant part. Alternatively or additionally, one or more symbols (such as a trademark or logo) may be pigment printed in the first plant part. Alternatively or additionally, one or more codes, such as a bar code or QR code may be pigment printed in the first plant part. The pattern may be regular or random, etc.

Hence, the method (for providing a non-uniform pigment distribution (in a first plant part) as described herein may also be indicated as method for providing a (pigment) pattern (in a first plant part). The non-uniform distribution is a man-made or non-natural non-uniform distribution.

Of course, the first plant part, and thus also especially the second plant part, may upon exposure to light also develop a non-uniform pigment distribution. However, the third plant part will (in average) be lighter than the second plant part. In other words, the (non-uniform) pigment accumulation is substantially higher in the second plant part than in the third plant part.

For instance, when measuring reflectance, the area averaged reflectance in the visible (380-780 nm) for the second plant part may be at least 5% smaller than for the third plant part; in the wavelength part where the pigment absorbs light, this reduction in area averaged reflectance may even be larger, such as a reduction of at least 10%, even more especially at least a reduction with 20%.

Alternatively or additionally, the area averaged anthocyanin index for the second plant part may be at least 5% higher, such as at least 10%, even more especially at least 20%, higher than for the third plant part.

The anthocyanin index can e.g. be measured using the DUALEX Scientific (Force-A, Polyphenol and chlorophyll-meter, Orsay Cedex France). In embodiments, a plurality of measurements is done per plant and averaged to obtain the data. The anthocyanin index is calculated by the DUALEX using the following formula:

$$\text{Anthocyanin index} = \text{Log}_e \frac{\text{Near} - \text{infrared } fluo. \text{ (excited red)}}{\text{Near} - \text{infrared } fluo. \text{ (excited green)}}$$

Here, "Near-infrared fluo." indicates the fluorescence in the IR (in the wavelength range of about 700-900 nm), "excited red" indicates under excitation in the red (600-700 nm), and "excitation green" indicates under excitation in the green (495-570 nm). Hence, with this formula the infrared fluorescence under red and green excitation are compared.

The method as described herein especially includes two stages, though there may be more than two stages.

In embodiments, the method comprises subjecting in a first (lighting) stage at least the first plant part to first light conditions that inhibit or prevent pigment accumulation in (at least) said first plant part. Pigment accumulation can be prevented by offering growth conditions that do not provide abiotic stress. Also the choice of the light recipe may be relevant. Offering light that contains substantially red contributions and relatively low UV and/or blue contributions may lead to biomass formation without coloration in the case of e.g. leafy vegetables. This may keep the plant (part) relatively pale during the first stage.

As indicated above, light conditions that inhibit or prevent pigment accumulation may especially refer to a low light level and/or a reduced blue and/or UV content of the light. Note that such conditions may in embodiments also be achieved with a substantial complete blockade of the light. Such solution, however, may also severely inhibit growth. Hence, especially plants that color during growth are with the method of the invention especially grown while receiving light, such that biomass may (still) be created, but coloration is substantially inhibited. Hence, abiotic non-stress light may be provided, such as in embodiments with light that has a substantial red (including optionally far red) component (see also below).

During the first stage, the daily light integral (DLI) may be chosen such that it is in the range of about 40-80% of the light saturation curve of the chlorophyll fluorescence, such as 40-60%, like 40-50%. Each plant part, such as a plant leave, has a characteristic light saturation curve defined by the plant genotype and age and pigmentation of the leaves. This light saturation curve is related to the maximum photosynthesis that is possible to achieve as a function of light levels. This can be measured for each type of plant. For a maximal plant growth light maximum should be chosen just below the saturation level. In order to achieve a growth without coloration, staying half way (about 40-60%) to the saturation is reasonable. In order to optimize growth speed, a more optimum light level may be defined per cultivar. This may still provide a normal growth, but pigment accumulation may not occur. The daily light integral for red type lettuce is in the range of about 7-9 mol/m$^2$/d (i.e. 7-9 mol per square meter per day). The DLI refers to the PAR range, i.e. 400-700 nm. The amount of (UV) radiation having a wavelength below 400 nm, if any, such as in the range of 200-400 nm, should be 1% or less, such as 0.3% or less, such as even less than 0.1%, of the DLI provided during the first (lighting) stage. In embodiments, during the first stage a light level of 7 mol/day per $m^2$ or less is applied, such as in the range of 3-6 mol/day per $m^2$.

The light saturation curve may e.g. be measured with a miniPPM, such as provided by EARS Plant Photosynthesis Monitoring Ltd, and as e.g. described in the internet publication
http://www.ears.nl/ppm/user_files/
  Measuring%20fluorescence%20and%20photo
  synthesis%2 0v2.pdf, by Andries Rosema and Gregory de
  Vries "Measuring fluorescence and photosynthesis", or as
  e.g. described by Taiz and Zeiger, Plant physiology, 5th
  edition, chapter 9.

The first stage, wherein the plant (part) may be grown under conditions favoring biomass production but reducing or inhibiting pigment accumulation may take at least a week, such as in the range of 2-20 weeks. This may depend upon the type of plant. The first stage can be defined such that there is enough biomass in order to print a pattern, if the leaves are too small the print will be more difficult and not visible. Some plant grow faster than others, and e.g. some lettuces are harvested before they reach the maximum growth size as consumers prefer young leaves which are less bitter.

After the first (lighting) stage, the second lighting stage may be commenced. Hence, the method may further comprise subsequently subjecting in a second lighting stage the second plant part of said first plant part to second light conditions that promote pigment accumulation in said second plant part while (still) subjecting the third plant part of said first plant part to third light conditions that inhibit or prevent pigment accumulation in said third plant part. In this way, pigment will accumulate at the second plant part, wherein no or less pigment will be accumulated at the third plant part. In this way, a pattern may be written with pigment in the first plant part. The third (light) conditions may be same as the first light conditions. They may also differ, but both the first (light) conditions and second (light) conditions are especially conditions under which in the first and/or third plant part pigment accumulation is prevented or at least inhibited.

As indicated above, light conditions that promote pigment accumulation may especially refer to a high light level and/or an increased blue and/or UV content of the light. Hence, abiotic stress light may be provided, such as light that has a substantial UV and/or blue component (see also below).

The second stage, wherein the plant (part) may be grown under conditions favoring pigment production may take a few days, such as in the range of 1-15 days. But this may (also) depend upon the type of plant.

Hence, in embodiments the method comprises providing in the first stage first light to said first plant part and providing in the second lighting stage second light to said second plant part, wherein a relative photon content of UV light and blue light of the second light is higher than of the first light, and wherein a relative photon content of red light and deep red light of the first light is higher than of the second light. The first light may especially be used to provide abiotic non-stress conditions; the second light may especially be used to provide abiotic stress conditions thereby inducing pigment accumulation. Note that in the second stage also second light may be provided to parts of the plant that are not comprised by the first plant part. However, if desired also in the second stage first light (or third light) may be provided to parts of the plant that are not comprised by the first plant part. The phrase "wherein a relative photon content of UV light and blue light of the second light is higher than of the first light" and similar phrases may indicated that the relative content of the UV light and blue light of the second light may be higher than of the first light due to the integrated contributions of both UV and blue light. Hence, one of them may be smaller or even absent, but the contribution of the other is such, that the total of UV light and blue light is higher (of the second light). For instance, the first light may include 0% UV and 5% blue and the second light may include 5% UV and 20% blue. However, to comply with the above condition, e.g. also 10% UV and 4% blue in the second light would lead to higher relative photon content of the UV light and blue light. As indicated above, the third light conditions may (substantially) be identical to the first light conditions, but may in embodiments also refer to the substantial absence of light (to the third plant part). Hence, in embodiments the third light conditions may be a continuation of the first light conditions. However, in other embodiments the third light conditions may e.g. be a blocking of second light conditions reaching the third plant part (while the second plant part is subjected to the second light conditions).

Especially, in the wavelength range of 300-800 nm the relative photon content in the wavelength range up to 475 nm is equal to or smaller than 15%, such as equal to or smaller than 10%, for the first light and equal to or larger than 20% for the second light, such as equal to or larger than 30%, and the relative photon content in the wavelength range of at least 600 nm is at least 30% for the first light, especially at least 40%, and at least 10% for the second light, but at maximum 80% for the second light, such as at maximum 60%, even more especially at maximum 50%. Especially, with these types of light, the right conditions can be created to provide the pigment accumulation pattern in the first plant part.

Two important absorption peaks of chlorophyll a and b are located in the red and blue regions, especially from 625-675 nm and from 425-475 nm, respectively. Additionally, there are also other localized peaks at near-UV (300-400 nm) and in the far-red region (700-800 nm). The main photosynthetic activity seems to take place within the wavelength range 400-700 nm. Radiation within this range is called photo synthetically active radiation (PAR).

As the first plant part may move due to ventilation, irrigation, or other factors, it may be desirable to immobilize the first plant part during at least the second stage. In this second stage, the main part of the growth may have been finished; the plant, especially the plant part, may be substantially mature, or at least be close to a predefined harvest stage. Hence, during the second (lighting) stage the first plant part may be configured in a fixed position to provide a clearly visible pattern without substantially blurring of the pigment borders. Hence, in embodiments the method may further comprise immobilizing the first plant part during the second lighting stage and subjecting the second plant part to said second light conditions.

These second light conditions may be achieved in different ways. In embodiments, the method may further comprise projecting second light to said second plant part, such as to impose the second light conditions to the second plant part. Projection may be done with a mask in contact with the first plant part, or with a remote mask, and also with a GOBO type of projector (i.e. projector with a mask between the light source and the optics of the projector ("go before optics"). With using a mask, it may not be necessary to use a specific light source to create the second light conditions to the second plant part of the first plant part only. For instance, the entire plant may be subjected to the second light conditions, except for the third plant part.

Hence, in embodiments the method may (thus) further comprise providing a mask to the first plant part, wherein the mask comprises a second mask part that is transmissive for light and a third mask part that is less light transmissive to light than the second mask part or is not light transmissive, with the second mask part corresponding to the second plant part and the third mask part corresponding to the third plant part. In specific embodiments, the method may further comprise coating the mask to the first plant part, wherein the coating is selected from the group consisting of an edible coating, a water washable coating, and a light degradable coating. Especially, the coating may be an edible coating and/or a water washable coating, yet even more especially, at least a washable coating. In this way, the coating may easily be washed away after application of the pattern.

Alternatively or additionally, in embodiments the method may further comprise subjecting the second plant part to laser light comprising said second light. Also in this way the second light conditions may be achieved. Also in these embodiments, it may be desirable to immobilize the first plant part during at least the second stage. Especially when using a device with a movable laser beam, or a movable laser device, it may be possible to provide the accumulated pigment pattern to different plant parts by moving the laser beam from one plant part to the other. Optionally, in combination with a sensor possible movements of the first plant part may be corrected for.

In yet a further aspect, the invention also provides the product obtainable by the method as defined herein.

After the pattern has been created, the plant (part) may be harvested. Hence, in yet a further aspect the invention provides a method for indoor cultivating a pigment generating plant, the method comprising subjecting a plant seedling for the plant to plant growing conditions (to grow the plant seedling to a (substantially) mature plant) and harvesting the plant or a first plant part thereof, wherein prior to harvesting the plant is subjected to the method for providing a non-uniform pigment distribution in a first plant part as defined herein. In yet a further aspect, the invention also provides the product obtainable by such method.

In an further embodiment, the method may further comprise a third lighting stage, applied after the pattern creating second lighting stage, wherein in the third lighting stage the first plant part is subjected to a fourth light condition creating abiotic non-stress conditions wherein biomass production is continued but substantial (further) pigment accumulation is prevented or inhibited in the first plant part. The fourth lighting condition may be substantially the same as the first light condition or the third light condition, but may also be different, provided that it prevents or inihibit pigment accumulation. The amount of UV and blue light (relative photon content in the wavelength range up to 475 nm) and the amount of red and deep red light (relative photon content in the wavelength range of at least 600 nm) in the fourth light condition may comply with the ranges as mentioned above in respect of the first/third light condition. In this embodiment, the pattern created in the second lighting stage is allowed to grow as part of the further growth and biomass creation of the first plant part due to application of the fourth light condition. Advantageously, the immobilization of the first plant part during the second lighting stage is stopped and the first plant part is released to further grow in this third lighting stage. Also masks or coatings used for the patterning in the second lighting stage may be removed before the start of the third lighting stage. The effect of the additional third lighting stage is the pigment pattern will further grow with the leaf and expand, and maybe distort or blurr in a specific way, which may have a desired additional artistic purpose. A further advantage of not patterning in the pre-harvest stage of plant cultivation is that, a specific pre-harvest light treatment, for example to controlling certain nutrient contents of the plant part(s), does not interfer with the pigment accumulation light treatment in the second lighting stage and is not influenced or jeopardized by a specific mask used in the pigment accumulation light treatment.

The inventors envision that the pigment accumulation may also occur post-harvest, as long as the first plant part maintains its photosynthetic function which is the basis for the manufacturing of nutrients like anthocyanin, i.e. as long as the first plant part if 'fresh'. In an embodiment, the second lighting stage may therefor occur post-harvest. It is however envisioned that the pigment accumulation will be less pronounced when the second lighting stage is applied post-harvest.

The method for indoor cultivating a pigment generating plant is especially an indoor horticulture method, such as applied in green houses or plant factories, especially plant factories. Such methods are in general highly or fully controlled. Hence, in yet a further aspect the invention also provides a computer program (product) enabled to carry out the method as defined herein when loaded on a computer. In yet a further aspect, the invention provides a record carrier (or data carrier, such as a USB stick, a CD, etc.) storing a computer program (product) as defined herein. Hence, the computer program (product), when running on a computer or loaded into a computer, brings about, or is capable of bringing about, the method as described herein. The term record carrier especially refers to a computer-readable medium and/or memory.

The computer-readable medium and/or memory may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel using, for example, time-division multiple access, code-division multiple access, or other wireless communication systems). Any medium known or developed that can store information suitable for use with a computer system may be used as the computer-readable medium and/or memory.

Additional memories may also be used. The computer-readable medium, the memory, and/or any other memories may be long-term, short-term, or a combination of long-and-short term memories. These memories configure the processor/controller to implement the methods, operational acts, and functions disclosed herein. The memories may be distributed or local and the processor, where additional processors may be provided, may be distributed or singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network, such as the Internet, is still within memory, for instance, because the processor may retrieve the information from the network.

The controllers/processors and the memories may be any type. The processor may be capable of performing the various described operations and executing instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit. Each of the above systems utilized for remote controlling of light sources may be utilized in conjunction with further systems.

In yet a further aspect, the invention provides a lighting system for lighting (at least) a first plant part of a pigment generating plant, the lighting system comprising a light source configured to generate light and optionally a mask system configured to configure a mask in a beam of light upstream of the first plant part. Additionally, the mask system may also be configured to immobilize the first plant part.

The lighting system is especially configured to execute the herein described method for providing a non-uniform pigment distribution in a first plant part. Hence, in embodiments the lighting system is configured to subject in a first lighting stage at least the first plant part to first light conditions that inhibit or prevent pigment accumulation in said first plant part, and subsequently subjecting in a second lighting stage the second plant part of said first plant part to second light conditions that promote pigment accumulation in said second plant part while subjecting the third plant part of said first plant part to third light conditions that inhibit or prevent pigment accumulation in said third plant part.

To this end, the lighting system may include a light source, especially a plurality of light sources. The lighting system may include one or more light sources which have a variable spectral light distribution, by which the light source may be able to provide the different light conditions. Alternatively or additionally, a plurality of different light sources are configured to provide the different light conditions. Alternatively or additionally, the lighting system may include a laser light source. Further, one or more light sources may have a tunable directionality of the light source light. Hence, the lighting system may also be configured in embodiments to control the direction of the light source light of one or more light sources. This may be obtained with one or more of moving light sources and/or moving optics (that may be comprised by the light sources). Further, the lighting system may include a mask system and/or a fixation system. The lighting system may be comprised by a horticulture system, which (latter) may also be configured to control one or more of temperature, humidity, irrigation, nutrient supply, etc. The term "controlling" especially refers to determining the behavior or supervising the running of an element. Hence, herein "controlling" may e.g. refer to imposing behavior to the light source etc.

The lighting system, light source, and method described herein, may be configured and/or may include a wide array of light modulation techniques. In an embodiment, a contact mask or proximity mask may be applied. Alternatively or additionally, a 'slide projector' (a remote mask that is imaged on the leaf) or a digital projector (beamer') may be applied. Alternatively or additionally, a laser may be used (to direct write). And then there may be more this is the range of what the inventors have seen used in photolithography.

The invention also provides such mask system per se.

Further, the invention also provides a fixation unit for fixating the first plant part. Such fixation unit may in embodiments be comprised by the mask system. For laser writing, e.g. a mask may not be necessary, and only a fixation unit may be applied. However, in embodiments it may even not be necessary to fixate a plant part when laser writing.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream". The term "upstream of the first plant part" may in embodiments refer to physical contact (of a mask) with the first plant part and may in other embodiments refer to a non-zero distance (of the mask) from the first plant part (including masks that may be included by a light source, such as a GOBO (see above))

In a specific embodiment, the light source comprises a solid state LED light source (such as a LED or laser diode). The term "light source" may also relate to a plurality of light sources. Hence, the term LED may also refer to a plurality of LEDs. A light source is especially configured to provide light source light. The light source light is used for providing the desired lighting conditions, optionally (temporarily) in combination with a mask.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

Blue light is herein defined as 400-500 nm. Herein, (deep) red especially refers to light having a wavelength in the range of 600-700 nm. Herein, the term light especially refers to any radiation in the wavelength range of 300-800 nm, even though part thereof may be considered UV radiation or IR radiation. PAR refers to the wavelength range of 400-700 nm. Far red radiation is in the range of 700-800 nm.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 2a-2c schematically depicts some aspects of the invention as well as some variants;

FIG. 3 schematically depicts a further aspect of the invention as well as some variants.

The schematic drawings are not necessarily on scale.

DETAILED DESCRIPTION OF THE EMBODIMENTS

Figure 1:
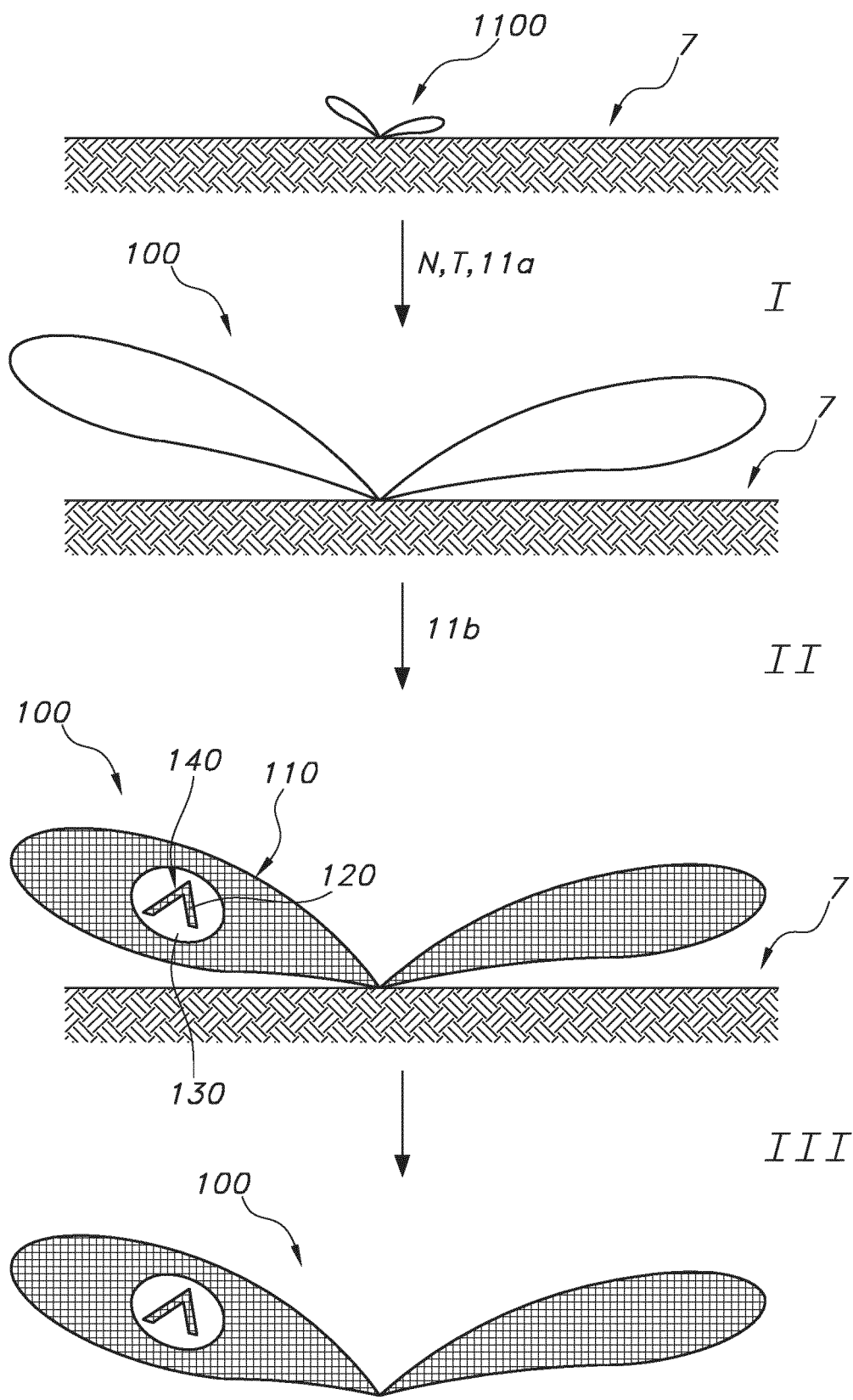
FIG. 1 schematically depicts some stages of embodiments of a method described herein.

FIG. 1 schematically depicts some stages of embodiments of a method of the invention as described herein. The method may include indoor cultivating a pigment generating plant 100. The method includes amongst others subjecting a plant seedling 1100 for the plant, such as here schematically depicted a non-fully grown plant, such as a plant just sprouted above the ground, with the ground being indicated with reference 7, to plant growing conditions, as indicated with the first stage I. For growth, first light conditions or first light 11*a* may be applied, that does substantially not provide abiotic stress. Hence, pigment formation may be low or (nearly) zero. References N and T indicate providing the necessary nutrients, including water, and subjecting the seedling 1100 and the plant 100 to the necessary temperature conditions. Both the supplies of nutrients as well as the temperature conditions are especially selected such that abiotic stress is small or absent.

A final stage is a harvesting stage, indicated with III, wherein the plant 100, or a first plant part 110 thereof is harvested. Prior to harvesting, but in embodiments when the plant or plant part is substantially mature, the plant is subjected to the method for providing a non-uniform pigment distribution in a first plant part 110 as described herein. This method may include providing the non-uniform pigment distribution in a first plant part 110 of the pigment generating plant 100 during indoor cultivation of said plant 100. The first plant part 110 comprises a second plant part 120 and a third plant part 130. The second plant part 120 and third plant part 130 may be used to provide a pattern including a plurality of patterns, such as a word, a trademark, a code, etc. This method comprises subjecting in a first lighting stage I at least the first plant part 110 to first light conditions that inhibit or prevent pigment accumulation in said first plant part 110, and subsequently subjecting in a second lighting stage II the second plant part 120 of said first plant part 110 to second light conditions that promote pigment accumulation in said second plant part 120 while subjecting the third plant part 130 of said first plant part 110 to third light conditions that inhibit or prevent pigment accumulation in said third plant part 130. The pattern provided is indicated with reference 140, here a "V". Hence, the second plant part 120, and optionally other plant parts except for the third plant part 130 is subjected to abiotic stress substantially only due to the application of the second light conditions. Hence, in the method of the invention, abiotic stress is substantially only provided with lighting conditions.

Figure 2A:
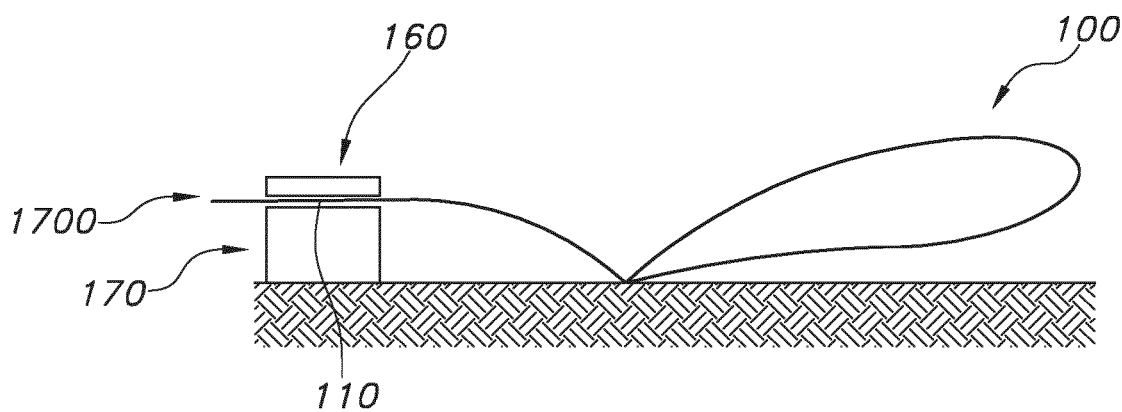
Figure 2B:
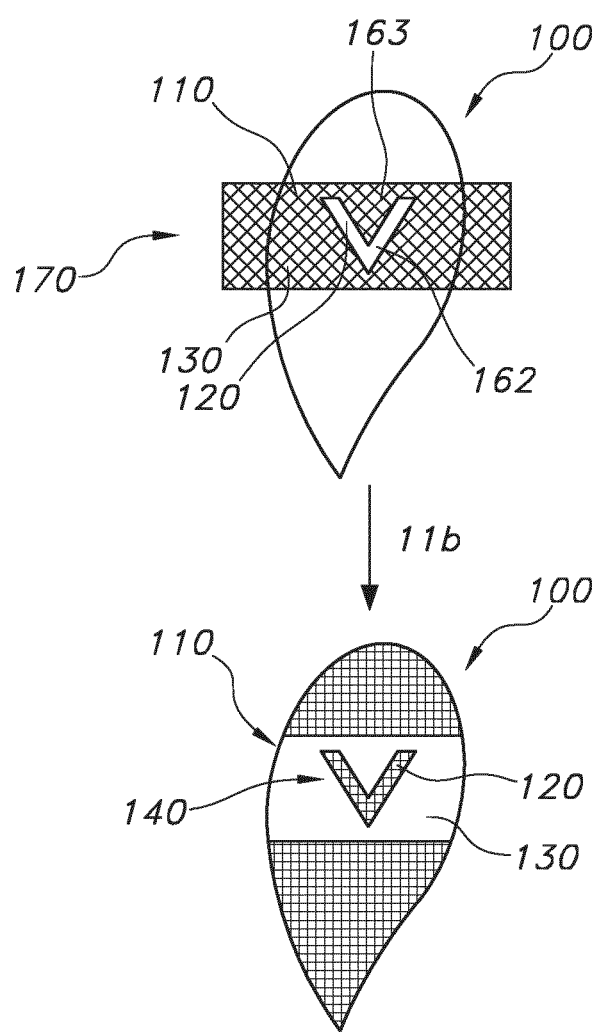

The product may be obtained in several ways, of which some are schematically depicted in FIGS. 2*a*-2*c* (and FIG. 3).

FIG. 2*a* schematically shows in side view an embodiment wherein the method further comprising immobilizing the first plant part 110 during (at least) the second lighting stage and subjecting the second plant part to said second light conditions by projecting second light (not shown) to said second plant part or by subjecting the second plant part to laser light comprising said second light. To this end, a fixation unit 170 may be applied, optionally in combination with a mask 160. The combination of fixation unit and mask or fixation unit and mask holder is herein also indicated as mask system 1700. With the fixation unit and/or mask system 1700 the first plant part 110 may be fixated, e.g. a few days.

FIG. 2*b* schematically depicts in top view part of the plant 100, in top view, with the mask over the plant part 110. The mask comprises a second mask part 162 that is transmissive for light—here a V-sign—and a third mask part 163 that is less light transmissive to light than the second mask part 162 or is not light transmissive, with the second mask part 162 (substantially) consequently corresponding to the second plant part 120 and the third mask part 163 (substantially) consequently corresponding to the third plant part 130. The result after application of the second light conditions or the second light 11*b* is schematically depicted in FIG. 2*b* below the arrow. Note that the remainder of the plant may also accumulate pigment, but only below the third mask part 163, substantially no pigment has been accumulated (i.e. third plant part 130). Pigment accumulation also took place in the second plant part 120, below the second mask part 162.

Optionally, also a laser or a GOBO projector may be applied. In such instance there is no mask close to the first plant part or even in contact with the first plant part. Fixation may nevertheless be desired, see FIG. 2*c* wherein the first plant part 110 is fixated with the fixation unit 170. Light may write the pattern 140, such as with the laser or GOBO (not shown).

FIG. 3 schematically depicts an embodiment of a lighting system 1000 for lighting a first plant part of a pigment generating plant, including some variants of the lighting system. Here, the lighting system 1000 comprises a light source 10 configured to generate light source light 11 (or shortly indicated "light 11") and a mask system 1700 configured to immobilize the first plant part and to configure a mask 160 in a beam of light 10 upstream of the first plant part. Different light sources 10 are schematically depicted, such as light sources 10 that can only provide first light and light sources that can only provide second light, but also a light source that can provide one or more of first light 11*a* and second light 11*b*. Further, schematically a laser light source 10 is depicted at the right of the drawing, with the laser light source 10 especially configured to provide laser light 150*b* comprising e.g. UV or blue light for accumulation of pigment. Light in general is indicated with reference 11.

EXAMPLE 1

In order to prevent coloration for a red type lettuce we should avoid sending a daily light integral (DLI) to the plant higher than 7 to 9 mol per day per $m^2$ (value for lettuces). Above that value we may not guaranty a good contrast between the coloration part and the non-colored part later on of the lettuce.

In the example the experiment was done on lettuce grown under a DLI of 5 mol per day per $m^2$ using a composition of red and white LED and an additional 15 to 25% of far red LED light (defined as 700-800 nm). This value is the average light level we would get in winter time in Europe. When the lettuce has grown enough to be harvested, we apply then a mask in order to get the pattern or branding imprint and change the light level to 14 mol/day per $m^2$ using 50% red and 50% blue only preferably with a long photoperiod (>18 h) for long day plants.

A low DLI might slow down the growth of the lettuce. In order to find a good balance in terms of productivity versus coloration, a slightly higher light level can be used (8 mol/day per $m^2$) in combination of a mask over the zone where coloration needs to be avoided. With a light level of 8 mol/day per $m^2$, a very mild coloration will occur on the lettuce exposed to the light and only with higher light level and the suppression of far red and change in the light quality the deep coloration (purple) will be achieved.

Preventing the coloration (anthocyanin accumulation) is achieved by using a combination of low light level and light rich in far red.

Red type lettuce was grown under these conditions and did not color red. Thereafter, a mask was applied to part of the lettuce, and the entire lettuce crop was subjected to light also including UV and blue light. The DLI was increased to about 8 mol per day per m². A logo was generated by pigment accumulation.

We also did grow lettuce with higher DLI of 8 mol/day/m² but with permanently having a mask positioned on one of the leaves selected for future printing of a logo. In this way, the total biomass production is maintained at maximum and the rest of the lettuce colors mildly except for the part that is screened by a mask. After some weeks, the mask is replaced by another patterned mask in coincidence with the application of a strong abiotic stress by light in order to achieve the print of a logo.

EXAMPLE 2

Red mustard was also grown under less than 8 mol/day/m². After 4 to 5 weeks the mustard can be exposed to a higher photoperiod light (up to 24 h per day) and with a higher blue content (50% of total PAR light), the DLI is then in the range of 13-16 mol/day/m2. The red mustard needs at least 7 days to accumulate anthocyanin and make a significant color change.

The term "substantially" herein, such as in "substantially all light" or in "substantially consists", will be understood by the person skilled in the art. The term "substantially" may also include embodiments with "entirely", "completely", "all", etc.

Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A method for providing a non-uniform pigment distribution in a first plant part of a pigment generating plant, which accumulates pigment upon exposure by light, during indoor cultivation of said plant, wherein the first plant part comprises a second plant part and a third plant part, the method comprising:
    in a first lighting stage, irradiating at least one of the second and third plant parts of the first plant part with first light that inhibits or prevents pigment accumulation in said at least one of the second and third plant parts of the first plant part, and
    subsequently, in a second lighting stage, irradiating the second plant part of said first plant part with second light that promotes pigment accumulation in said second plant part while subjecting the third plant part of said first plant part to third light that inhibits or prevents pigment accumulation in said third plant part,
    wherein, during both the first lighting stage and the second lighting stage, inhibition or promotion of pigment accumulation is achieved only through exposure of the first plant part to light irradiation.

2. The method according to claim 1, comprising selecting the second plant part and the third plant part to form a pattern provided during the second lighting stage by pigment content differences, with the second plant part having a higher pigment accumulation than the third plant part.

3. The method according to claim 2, wherein the pattern comprises one or more of a letter, a symbol, and a code.

4. A method for providing a non-uniform pigment distribution in a first plant part of a pigment generating plant, which accumulates pigment upon exposure by light, during indoor cultivation of said plant, wherein the first plant part comprises a second plant part and a third plant part, the method comprising:
    subjecting in a first lighting stage at least the first plant part to first light that inhibits or prevents pigment accumulation in said first plant part, and
    subsequently subjecting in a second lighting stage the second plant part of said first plant part to second light that promotes pigment accumulation in said second plant part while subjecting the third plant part of said first plant part to third light that inhibits or prevents pigment accumulation in said third plant part,
    wherein a relative photon content of UV light and blue light of the second light is higher than of the first light, and wherein a relative photon content of red light and deep red light of the first light is higher than of the second light, and wherein, during both the first lighting stage and the second lighting stage, inhibition or promotion of pigment accumulation is achieved only through exposure of the first plant part to light irradiation.

5. The method according to claim 4, wherein in wavelength range of 300-800 nm the relative photon content in the wavelength range up to 475 nm is equal to or smaller than 15% for the first light and equal to or larger than 20% for the second light, and wherein the relative photon content in the wavelength range of at least 600 nm is at least 30% for the first light and at least 10% for the second light.

6. The method according to claim 1, comprising indoor cultivation of said plant under abiotic non-stress conditions during the first stage.

7. The method according to claim 1, wherein the plant comprises a leafy vegetable.

8. The method according to claim 1, wherein the plant comprises a red type lettuce or a red leafy green.

9. The method according to claim 1, further comprising (i) immobilizing the first plant part during the second lighting stage and subjecting the second plant part to said second light or (ii) subjecting the second plant part to laser light comprising said second light.

10. The method according to claim 1, wherein the spectral composition of the first light is different from the spectral composition of the second light.

11. The method according to claim 1, wherein a relative photon content of UV light and blue light of the second light is higher than of the first light, and wherein a relative photon content of red light and deep red light of the first light is higher than of the second light.

12. The method according to claim 11, wherein, in wavelength range of 300-800 nm, the relative photon content in the wavelength range up to 475 nm is equal to or smaller than 15% for the first light and equal to or larger than 20% for the second light, and wherein the relative photon content in the wavelength range of at least 600 nm is at least 30% for the first light and at least 10% for the second light.

13. The method according to claim 11, wherein a pattern is formed by the second plant part and the third plant part during the second lighting stage by pigment content differences, with the second plant part having a higher pigment accumulation than the third plant part, wherein the pattern comprises one or more of a letter, a symbol, and a code.

14. The method according to claim 1, wherein the first plant part is less than all of the pigment generating plant.

15. The method according to claim 1, wherein, in the first lighting stage, all of the first plant part is irradiated with the first light.

16. The method according to claim 1, wherein, in the first lighting stage, less than all of the first plant part is irradiated with the first light.

* * * * *